US012769606B2

(12) United States Patent
Elazzami et al.

(10) Patent No.: US 12,769,606 B2
(45) Date of Patent: Oct. 20, 2026

(54) COMMON HANDLER FOR MULTITUDE OF CRASH FAILURES

(71) Applicant: Dell Products L.P., Round Rock, TX (US)

(72) Inventors: Bassem Elazzami, Austin, TX (US); Karunakar Poosapalli, Telangana (IN); Ibrahim Sayyed, Georgetown, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/241,059

(22) Filed: Aug. 31, 2023

(65) Prior Publication Data

US 2025/0077334 A1 Mar. 6, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0736* (2013.01); *G06F 11/0787* (2013.01)

(58) Field of Classification Search
None
See application file for complete search history.

(56) References Cited

U.S. PATENT DOCUMENTS 5,774,647 A * 6/1998 Raynham ............... G11C 29/44 714/48
10,067,834 B1 * 9/2018 Montero ............. G06F 11/1417
11,366,710 B1 * 6/2022 Hung .................. G06F 11/0772
12,204,914 B2 * 1/2025 Sayyed ............... G06F 11/1417
2008/0141077 A1 * 6/2008 Swanson ............... G06F 11/008 714/48
2013/0300567 A1 * 11/2013 Zou ..................... G06F 11/2284 340/815.45
2020/0151048 A1 * 5/2020 Shantamurthy ..... G06F 11/0751
2023/0205574 A1 * 6/2023 Hsu ....................... G06F 9/4812 710/267

(Continued)

OTHER PUBLICATIONS

"Embedded Controller," Wikipedia (Year: 2025).*

(Continued)

*Primary Examiner* — Bryce P Bonzo
*Assistant Examiner* — Gabriella Kanani Shelton
(74) *Attorney, Agent, or Firm* — Jackson Walker L.L.P.

(57) ABSTRACT

Disclosed systems and methods for handling failures in an information handling system enable one or more crash handlers to communicate crash handler notifications to an EC of the information handling system. The EC is configured to perform crash operations including detecting a crash occurrence associated with either a crash handler notification from any of the one or more crash handlers or an SMM crash event. The EC may extract and store crash context information associated with the crash occurrence. The crash handler notifications may be communicated to the EC as MBOX commands via a peripheral interconnect, e.g., an enhanced serial peripheral interconnect (eSPI). Detecting a crash occurrence associated with the SMM event may include initiating an EC timer responsive to receiving an SMM entry message from an SMM handler and detecting the EC timer reaching a threshold value before the EC receives an SMM exit message.

14 Claims, 4 Drawing Sheets

(56) References Cited

U.S. PATENT DOCUMENTS

2023/0350756 A1 * 11/2023 Ladkani .............. G06F 11/0772

OTHER PUBLICATIONS

"What is a Baseboard Management Controller? (BMC)," SuperMicro (Year: 2025).*
Dreamlayers, "How an I/O port leads to System Management Mode" (Year: 2012).*
IBM, "System Management Mode".*

* cited by examiner

COMMON HANDLER FOR MULTITUDE OF CRASH FAILURES

TECHNICAL FIELD

The present disclosure pertains to information handling systems and, more particularly, the handling of failures within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may, from time to time, hang or freeze. Hang and freeze conditions occur, for example, when a display screen, mouse pointer, and keyboard of a desktop or laptop computer are all unresponsive, making it impossible to use the computer and causing frustration and loss of productivity. In addition, hang and freeze events may result in data loss, system crashes, and other issues that can impact the user's ability to complete tasks. For example, a user running an audio conferencing application on an information handling system can experience a sudden system freeze that disables mouse and keyboard functions.

Hang and freeze issues are often difficult to debug and perform root cause analysis on due, at least in part, to a lack of logging mechanisms encompassing cross operating environment interactions including OS-to-device-firmware interactions such as OS-to-embedded controller (EC), OS-to-Basic I/O System (BIOS) via system management mode (SMM), OS-to-Nonvolatile (NV) memory express (NVMe) firmware, and OS-to-monitor firmware.

Diagnostic modules in at least some information handling systems may monitor OS-device interactions to trigger firmware-based self-tests and collect telemetry for various firmware variables. As part of these self-tests, an OS may send a command to the firmware of an EC, NVMe, solid state drive (SSD), display monitor, or other system device. The OS command may instruct the device to run a self-test to evaluate device health. During such communications, a system hang or freeze may occur within an SMM handler or device firmware path.

Telemetry resources in at least some information handling systems may communicate with the EC to collect telemetry data regarding, as non-limiting examples, system fans, cables, battery, and thermal parameters. In at least some systems, these communications may be associated with audio glitches and frequent polling of data triggering undesirably frequent kernel calls from model specific registers (MSRs) of the central processing unit (CPU).

SUMMARY

Disclosed features and resources support root cause analysis and remediation of real time freeze/hang issues. In at least some embodiments, disclosed methods execute at a native firmware level to track and handle interactions at each operating level as well as interactions that cross OS/firmware boundaries.

In at least one approach, embodiments may implement, at one or more OS/firmware crossing points, infrastructure that vectors a crash handler to enable the EC to detect and monitor crash handler notifications and identify a crash context, i.e., a context or state of the system when the crash occurred, to enable runtime remediation. In at least one embodiment, crash handler codes are communicated to the EC via MBOX messages via an enhanced Serial Peripheral Interface (eSPI) or a suitable alternative interconnect. For systems featuring diagnostic light emitting diodes (dLEDs), embodiments may drive unique dLED patterns to indicate crash handler codes.

Embodiments may address hang and freeze failures encountered in the boot path, from Power ON through BIOS boot stages, until the system reaches a suitable runtime state, e.g., a desktop state. Embodiments may enable runtime SMM crash analysis and different boot stage crash handling with EC safe assurance crash handlers. Embodiments may employ a common crash handler (CCH) module, for pre boot and runtime SMM crashes with EC safe assurance MBOX handlers and one or more new MBOX commands. Embodiments may implement a new MBOX command for EC and BIOS firmware handler modules to share crash context data. Crash handlers may communicate with the EC via the new MBOX command(s) and store crash context information in nonvolatile storage of the EC.

EC firmware may monitor pre boot and runtime firmware failures including, as illustrative examples, NO POST (power on self-test), NO VIDEO, NO POWER, and/or NO BOOT generated by information handling systems from Dell Technologies. For systems implementing Universal Extensible Firmware Interface (UEFI) compliant boot paths, the firmware failures monitored by the EC may include failures occurring during pre-EFI initialization (PEI), driver execution environment (DXE), and/or SMM phases of the boot path.

In some embodiments, EC firmware solution may register for certain general-purpose input/output (GPIO) pins to poll the GPIO status. When a BIOS firmware crash handler toggles the GPIO pins, the EC can detect the crash. EC firmware may support runtime remediation operations that indicate crash handler states by illuminating one or more predetermined patterns of a system's diagnostic LEDS.

Crash context may be conveyed via telemetry to restore a platform to a predetermined state. In addition, embodiments may support a resilience method to load bare minimal firmware network stack modules and initialize a thin network stack to share the crash context over cloud and enable recovery of a previous boot BIOS.

Disclosed subject matter thus encompasses EC-based capability to monitor, identify, and capture SMM and other catastrophic firmware/software failures using I/O communications between the EC and BIOS and storage in EC nonvolatile memory. Unique EC GPIO patterns and/or unique diagnostic LED patterns may be generated for different failure modes during OS firmware communication. Telemetry capability may be leveraged to report catastrophic runtime failures with pertinent context regarding the failing OS application.

Disclosed features beneficially support automated remediation and reduced frequency and volume of warranty calls. In addition, implementing disclosed features within device firmware results in solutions that are silicon agnostic and OS agnostic.

In one aspect, disclosed systems and methods for handling failures in an information handling system enable one or more crash handlers to communicate crash handler notifications to an EC of the information handling system. The EC is configured to perform crash operations including detecting a crash occurrence associated with either a crash handler notification from any of the one or more crash handlers or an SMM crash event. The EC may extract and store crash context information associated with the crash occurrence. The crash handler notifications may be communicated to the EC as MBOX commands via a peripheral interconnect, e.g., an enhanced serial peripheral interconnect (eSPI). Detecting a crash occurrence associated with the SMM event may include initiating an EC timer responsive to receiving an SMM entry message from an SMM handler and detecting the EC timer reaching a threshold value before the EC receives an SMM exit message.

One or more GPIO pins may be registered for or otherwise associated with disclosed crash handling features and one or more crash handler, e.g., a BIOS crash handler, may be configured to toggle the registered GPIO pins to indicate a crash occurrence. In at least some embodiments, the EC may illuminate light emitting diodes (LEDs) of the EC selectively to generate an LED pattern indicative of the crash occurrence. The EC may support a plurality of crash event LED patterns and each LED pattern may correspond to a particular crash event.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
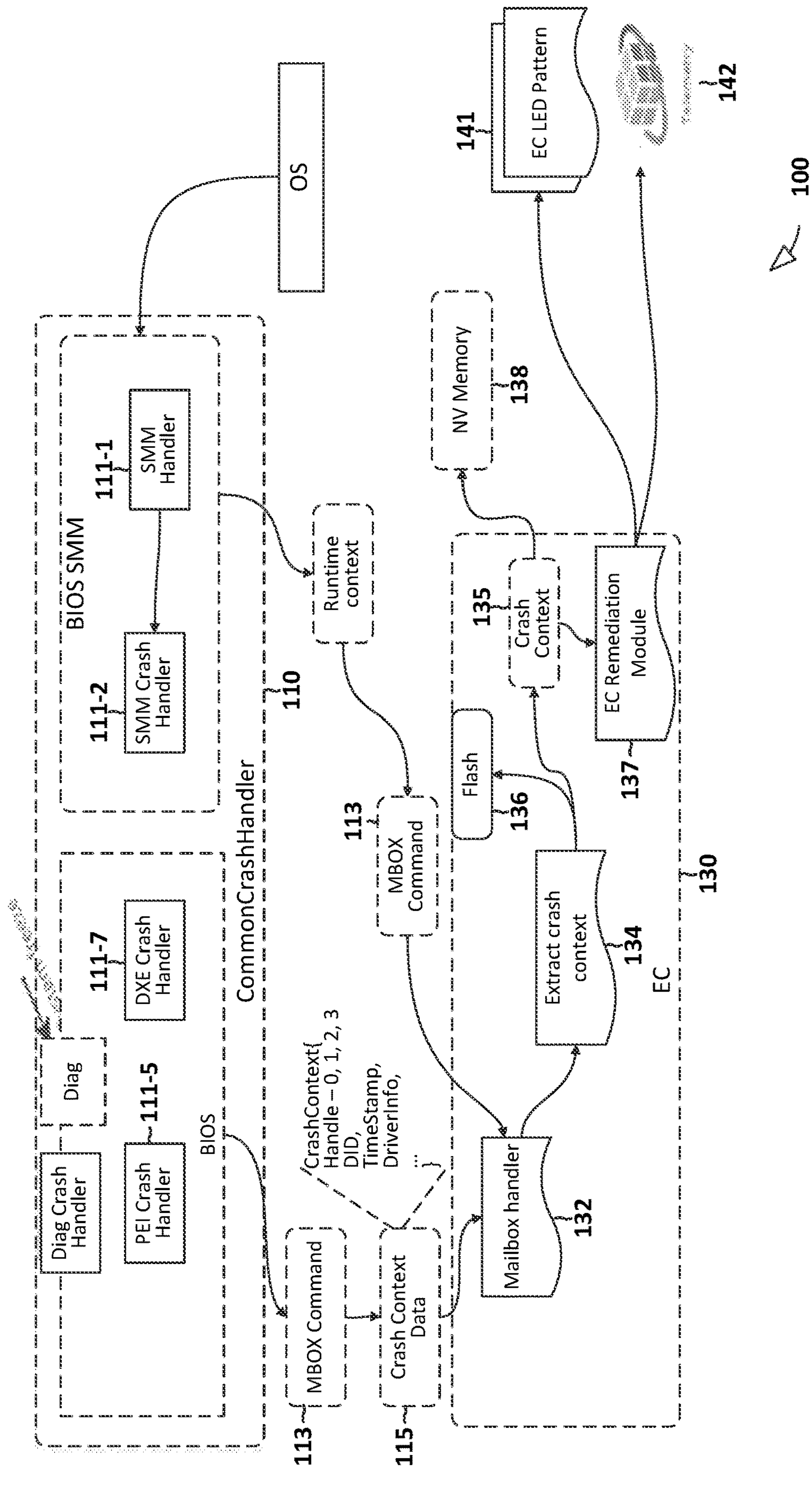
FIG. 1 illustrates an information handling system configured with a common crash handler and EC features to handle a multitude of catastrophic software and firmware failures.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system, referred to herein simply as platform 100, including EC-based features for monitoring and remediation of runtime and pre boot catastrophic failures.

BIOS firmware crash handlers. The illustrated platform 100 includes an EC 130 and a common crash handler (CCH) 110 provisioned with pre boot and runtime crash handlers 111. The crash handlers 111 depicted in FIG. 1 include an SMM handler 111-1, an SMM crash handler 111-2, a PEI crash handler 111-5, and a DXE crash handler 111-7. SMM is used by OEMs to interact with NV storage and other hardware, emulate hardware functionality, handle hardware interrupts or errata, and perform other functions. SMM runs in the form of interrupt handlers that are triggered by timers or access to certain memory, registers, or hardware resources. OEM drivers and runtime firmware services may explicitly trap SMM to control certain hardware functionality.

Crash handlers 111 may be notified at runtime for any crash, hang, or freeze that occurs, whether in a pre boot or runtime operating environment. When a crash handler 111 is notified of or otherwise detects a crash event, it may write or otherwise record crash context data 115, indicative of a platform context or state associated with the crash event, to a runtime memory location. In addition, at least some embodiments of platform 100 support methods to update an interrupt vector table (not depicted in FIG. 1) of platform 100 with pointers to one or more of the crash handlers 111.

New BOX commands for EC communication with CCH. In at least some embodiments, platform 100 supports one or more unique and previously undisclosed MBOX commands 113 enabling communication between EC 130 and the crash handlers 111 of CCH 110 to capture catastrophic failures and share crash context data. The illustrated EC 130 includes a mailbox handler 132 to process MBOX command(s) 113 conveying crash context data 115. As depicted EC 130 extracts (134) a crash context 135 from the crash context data and pushes the extracted crash context to EC flash storage 136 and/or external NV memory 138. FIG. 1 further depicts an EC remediation module 137 to receive crash context 135 and selects or otherwise interfaces with EC LED patterns 141 and sends the crash context 135 as telemetry data to cloud-based storage 142.

EC Timer to Monitor firmware Pre boot and Runtime crashes. In at least some embodiments, firmware of EC 130 monitors pre boot and runtime firmware failures that generate No Post, No Video, or similar indications. In at least some embodiments, EC firmware registers for GPIO pins to poll the GPIO status. A BIOS firmware crash handler may toggle one or more of the applicable GPIO pins, thereby enabling the EC to detect certain events. For example, the EC may be notified whenever the platform enters or exits SMM. If the EC handler detects an SMM entry and does not receive timely notification of an SMM exit, the EC handler may conclude that a crash has occurred. The EC may then log the event and perform appropriate actions such as generating an LED pattern 141 appropriate for the status, send telemetry data to cloud-based storage 142 and/or local storage, before executing a cold reset and/or taking another appropriate recovery action.

Figure 2:
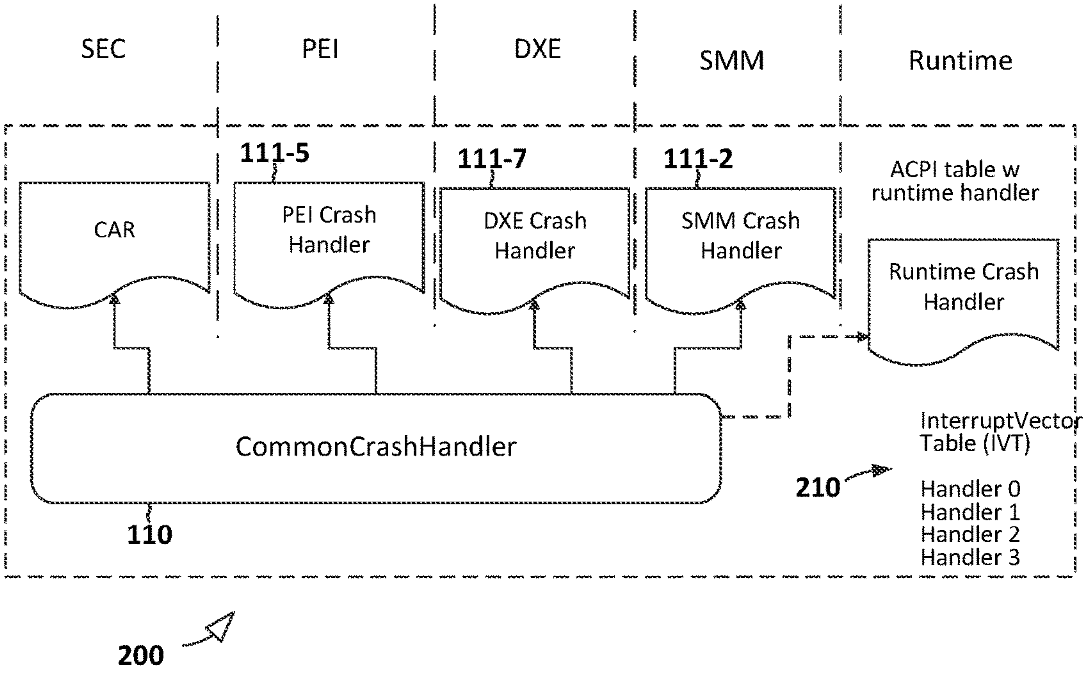
FIG. 2 illustrates a common crash handler in the context of a UEFI boot sequence.

Referring now to FIG. 2, an exemplary implementation 200 of firmware crash handlers 111 is depicted. The implementation 200 depicted in FIG. 2 includes a CCH 110 configured to create and handle various crash modes. In at least some embodiments, CCH 110 may be configured to update pointers or other information in the platform's interrupt vector table (IVT) 210. Each crash handler 111 may generate crash context packets and send the generated packets to EC 130 as MBOX compliant messages via eSPI or another suitable interconnect.

In at least some embodiments, CCH 110 defines reserved memory locations corresponding to each individual crash handler 111 and sets type information for each crash handler memory location to permit pre boot and runtime access. In embodiments that include a UEFI-compliant boot path, the reserved memory locations may be passed from a PEI phase to later phases using UEFI-compliant handoff blocks (HOBs).

Some embodiments of the illustrated configuration 200 may create distinct pre boot crash handlers 111 corresponding to a stage or phase of the UEFI compliant boot path. The pre boot crash handlers depicted in FIG. 2 include SMM crash handler 111-2, PEI crash handler 111-5, and DXE crash handler 111-7. Other implementations may include more, fewer, and/or different pre boot crash handlers.

Figure 3:
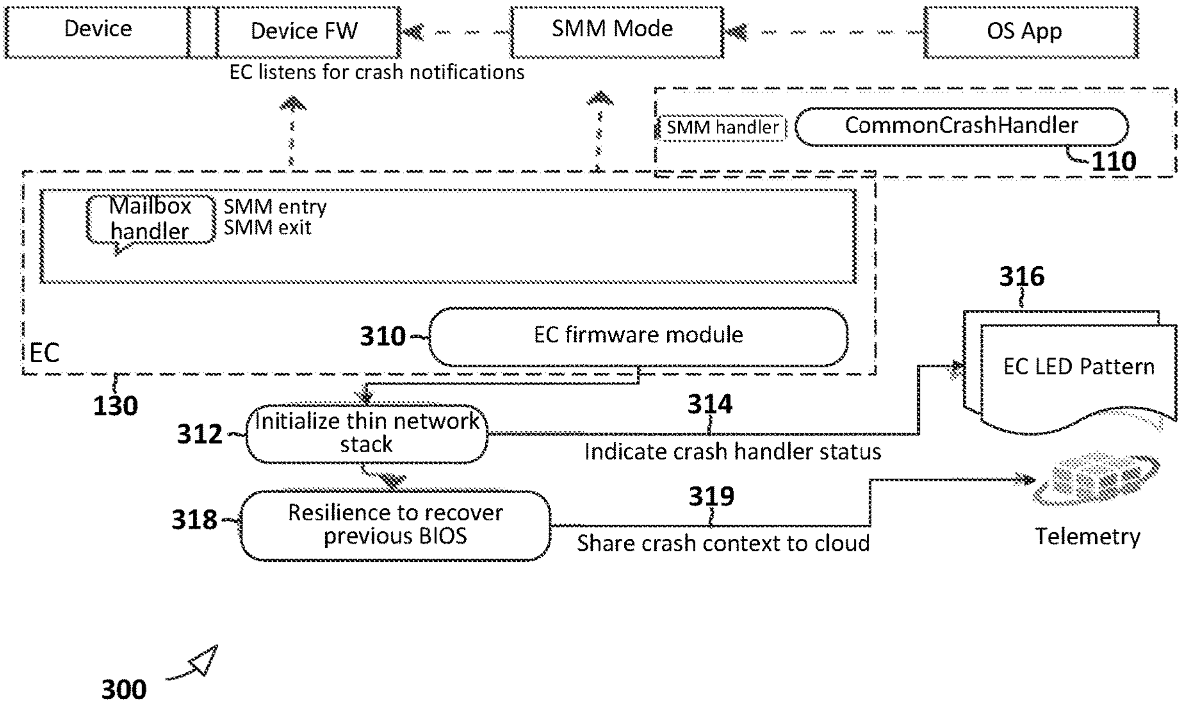
FIG. 3 illustrates a common crash handler operable within an SMM context.

FIG. 3 illustrates an exemplary implementation 300 for an EC firmware module 310 that supports a timer function for monitoring pre boot and runtime crashes. The illustrated EC firmware module 310 is configured to initialize (312) a thin network stack to indicate (314) crash handler status by means of a corresponding pattern 316 for EC diagnostic LEDs. EC firmware module 310 may also employ resilience features 318 to recover a previous BIOS and/or share (319) crash context telemetry.

Figure 4:
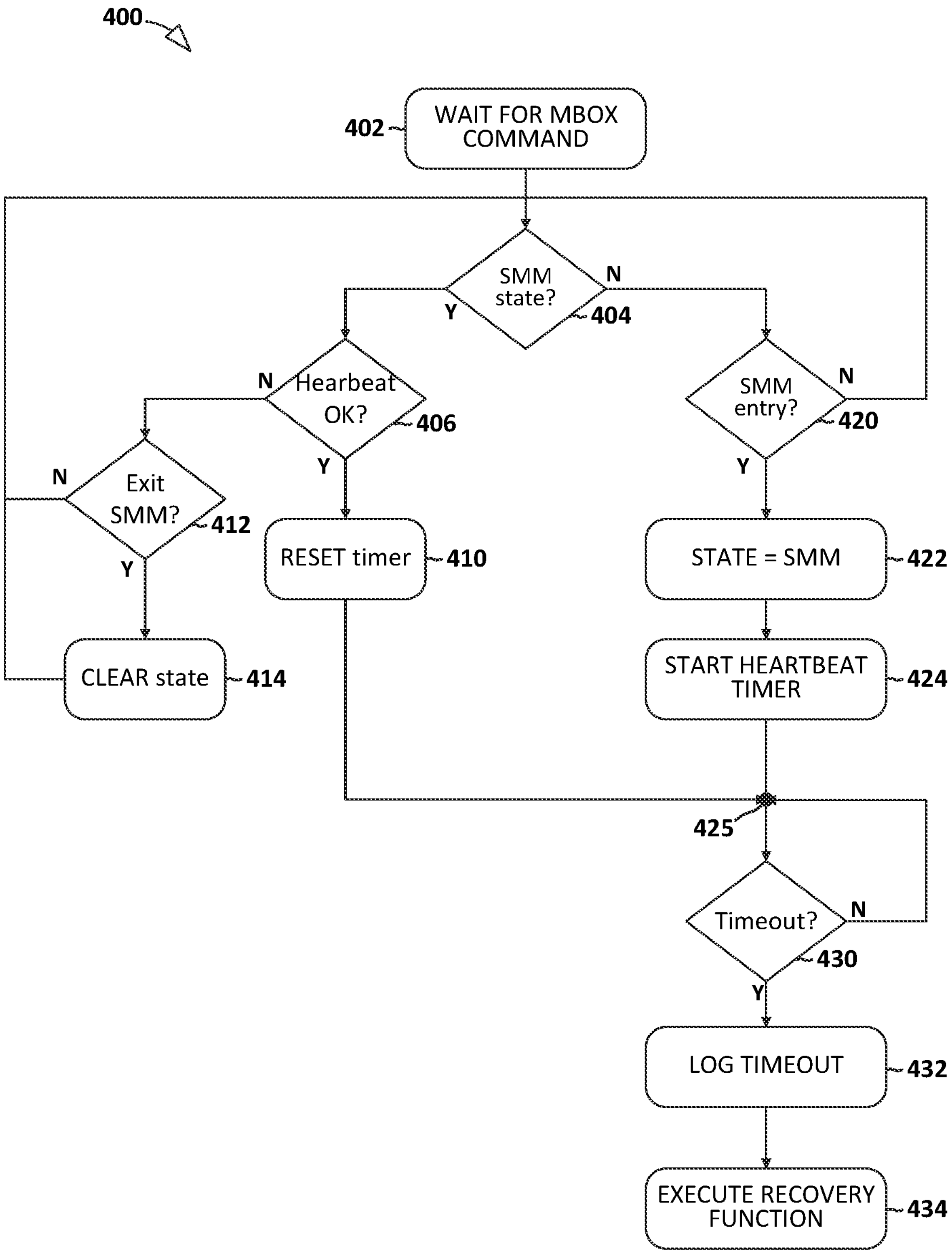
FIG. 4 illustrates a flow diagram of a common crash handler method operable within an SMM context.

FIG. 4 illustrates an exemplary flow diagram 400 of operations performed by the EC firmware module 310 of FIG. 3 to implement an EC timer for monitoring firmware preboot and runtime crashes. The method 400 illustrated in FIG. 4 begins with the EC waiting (402) for an MBOX command. When an MBOX command is received, method 400 determines (404) whether the platform is in an SMM state. If the platform is in an SMM state, method 400 determines (406) whether a heartbeat of the device is OK. If the heartbeat is okay, a timer is reset (410) and method 400 transitions to node 425 (discussed below). If the heartbeat is not OK, method 400 determines (412) whether an SMM exit has been received, and if so, clears (414) the SMM state and branches back to operation 404.

If it is determined in operation 404 that the platform is not in an SMM state, the illustrated method determines (420) whether an SMM entry has been detected. If not, method 400 branches back to operation 404. If an SMM entry has been detected, the SMM state is set (422), a heartbeat timer is started (424) and method 400 transitions to node 425, where it will remain unless and until a timeout signal, indicating that the heartbeat signal has satisfied a timeout criteria, e.g., remained static for longer than a threshold duration, is detected. If a timeout signal is detected (430), method 400 logs (432) the timeout and executes (434) a cold reset or another suitable recovery function.

Figure 5:
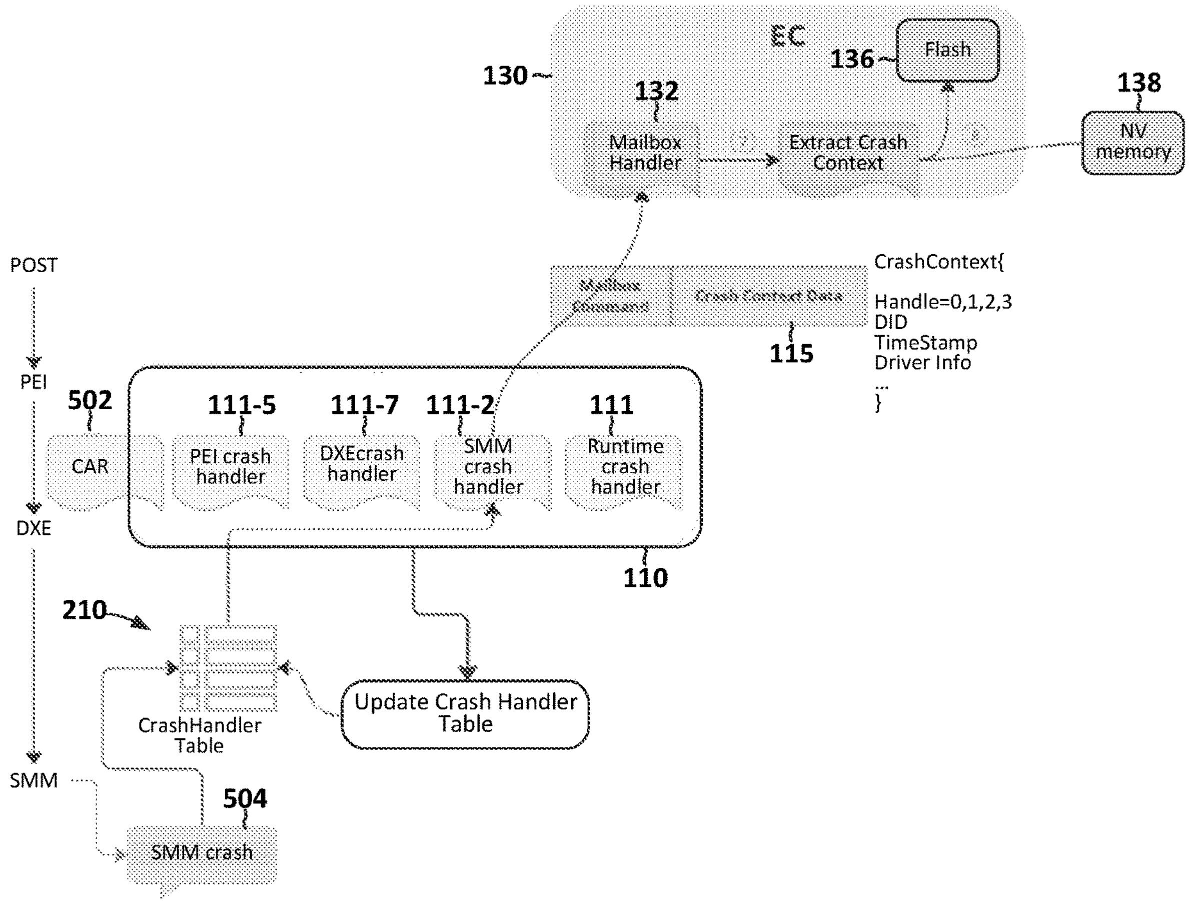
FIG. 5 illustrates a common crash handler suitable for use in conjunction with a UEFI boot sequence interacting with an EC.

FIG. 5 illustrates CCH 110 implementing distinct preboot firmware crash handlers 111 for distinct phases of a UEFI boot sequence to handle, in the depicted example, an SMM crash 504. Before system memory is initialized, the illustrated implementation employs cache-as-RAM (CAR) 502. Once the system memory is initialized, crash handlers may be executed from physical memory. Reserved memory may be populated with crash handler table 210.

When a crash occurrence happens, the applicable crash handler's callback will be notified and a crash context pointer will be retrieved from crash handler table 210 to notify the appropriate crash handler 111. The crash handler extracts and processes a crash context and sends crash content data 115 to EC mailbox handler 132. EC 130 identifies a "Crash Log" MBOX command and stores crash context information in onboard flash 136, off-chip NV memory 138, which may be implemented via an SPI flash memory device or another suitable NV storage resource, or both.

Figure 6:
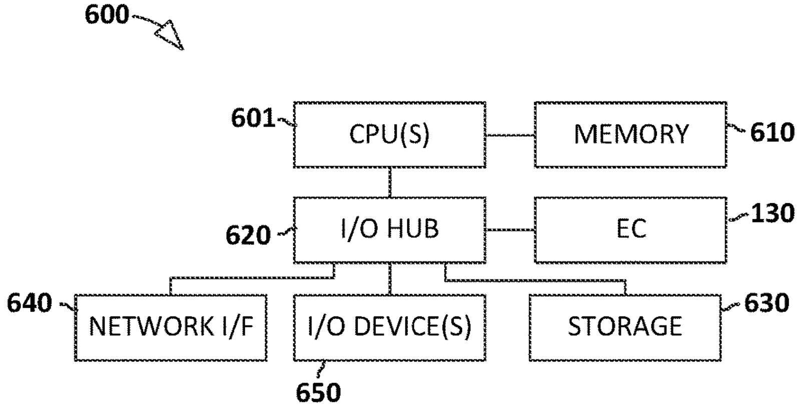
FIG. 6 illustrates an information handling system suitable for use in conjunction with features disclosed in FIGS. 1-5.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes an EC 130. In addition to crash handling features described above in reference to FIGS. 1-5, EC 130 may provide or support various system management functions and, in at least some implementations, keyboard controller functions. Exemplary system management functions that may be supported by EC 130 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 130 may support battery management features to control charging of the battery in addition to switching between the battery and AC adapter as the active power source changes or monitoring the various battery status metrics such as temperature, charge level and overall health. EC 130 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for handling failures in an information handling system, the method comprising:
- enabling one or more crash handlers to communicate crash handler notifications to an embedded controller (EC) of the information handling system, wherein the EC is configured to perform keyboard controller functions and one or more system management functions selected from: one or more thermal management functions or one or more management functions;
- associating one or more general purpose input/output (GPIO) pins with crash handling;
- and configuring at least one of the crash handlers to toggle at least one of the one or more GPIO pins to indicate a crash occurrence;
- configuring the EC to perform crash operations including:
- registering the EC to poll status of the one or more GPIO pins;
- detecting a crash occurrence associated with either:
- a crash handler notification indicated by the status of the one or more GPIO pins;
- or a system management mode (SMM) crash event;
- and extracting and storing crash context information associated with the crash occurrence.

2. The method of claim 1, wherein crash handler notifications are communicated to the EC as MBOX commands via a peripheral interconnect.

3. The method of claim 2, wherein the peripheral interconnect comprises an enhanced serial peripheral interconnect (eSPI).

4. The method of claim 1, wherein detecting a crash occurrence associated with the SMM event includes:
- initiating an EC timer responsive to receiving an SMM entry message from an SMM handler; and
- detecting the EC timer reaching a threshold value before the EC receives an SMM exit message.

5. The method of claim 1, wherein said configuring of at least one of the crash handlers comprises configuring a basic input/output system (BIOS) crash handler to toggle at least one of the one or more GPIO pins.

6. The method of claim 1, further comprising illuminating, by the EC, light emitting diodes (LEDs) of the EC selectively to generate an LED pattern indicative of the crash occurrence.

7. The method of claim 6, wherein the LED pattern is selected from a plurality of LED patterns, where each LED pattern corresponds to a particular crash event.

8. An information handling system comprising:
- a central processing unit (CPU);
- an embedded controller (EC), wherein the EC is configured to perform keyboard controller functions and one or more system management functions selected from: one or more thermal management functions or one or more management functions;
- a system memory, accessible to the CPU, including processor executable instructions that, when executed by the CPU, cause the system to perform operations including:
  - enabling one or more crash handlers to communicate crash handler notifications to the EC;
  - associating one or more general purpose input/output (GPIO) pins with crash handling;
  - configuring at least one of the crash handlers to toggle at least one of the one or more GPIO pins to indicate a crash occurrence; and
  - configuring the EC to perform crash operations including:
    - registering the EC to poll status of the one or more GPIO pins;
    - detecting a crash occurrence associated with either:
      - a crash handler notification indicated by the status of the one or more GPIO pins; or
      - a system management mode (SMM) crash event; and
    - extracting and storing crash context information associated with the crash occurrence.

9. The information handling system of claim 8, wherein crash handler notifications are communicated to the EC as MBOX commands via a peripheral interconnect.

10. The information handling system of claim 9, wherein the peripheral interconnect comprises an enhanced serial peripheral interconnect (eSPI).

11. The information handling system of claim 8, wherein detecting a crash occurrence associated with the SMM event includes:
- initiating an EC timer responsive to receiving an SMM entry message from an SMM handler; and
- detecting the EC timer reaching a threshold value before the EC receives an SMM exit message.

12. The information handling system of claim 8, wherein said configuring of at least one of the crash handlers comprises configuring a basic input/output system (BIOS) crash handler to toggle at least one of the one or more GPIO pins.

13. The information handling system of claim 8, further comprising illuminating, by the EC, light emitting diodes (LEDs) of the EC selectively to generate an LED pattern indicative of the crash occurrence.

14. The information handling system of claim 13, wherein the LED pattern is selected from a plurality of LED patterns, where each LED pattern corresponds to a particular crash event.

* * * * *